US011885158B2

(12) United States Patent
Cumbo et al.

(10) Patent No.: US 11,885,158 B2
(45) Date of Patent: Jan. 30, 2024

(54) DEPLOYABLE HANDLE SYSTEM USING REMOTE ACTUATOR

(71) Applicant: Magna Mirrors of America, Inc., Holland, MI (US)

(72) Inventors: Francesco Cumbo, Newmarket (CA); Franco Ottino, Newmarket (CA)

(73) Assignee: Magna Mirrors of America, Inc., Holland, MI (US)

( * ) Notice: Subject to any disclaimer, the term of this patent is extended or adjusted under 35 U.S.C. 154(b) by 813 days.

(21) Appl. No.: 16/720,214

(22) Filed: Dec. 19, 2019

(65) Prior Publication Data

US 2020/0199916 A1 Jun. 25, 2020

Related U.S. Application Data

(60) Provisional application No. 62/782,134, filed on Dec. 19, 2018.

(51) Int. Cl.

| | |
|---|---|
| ***E05B 79/06*** | (2014.01) |
| ***E05B 79/20*** | (2014.01) |
| ***E05B 79/22*** | (2014.01) |
| *E05B 83/36* | (2014.01) |
| *E05B 85/10* | (2014.01) |

(52) U.S. Cl.

CPC .............. *E05B 79/06* (2013.01); *E05B 79/20* (2013.01); *E05B 79/22* (2013.01); *E05B 83/36* (2013.01); *E05B 85/10* (2013.01)

(58) Field of Classification Search

CPC .......... E05B 79/06; E05B 79/20; E05B 79/22; E05B 83/36; E05B 85/10; E05B 81/06; E05B 81/14; E05B 81/34; E05B 15/004; E05B 81/25; E05B 85/107; E05B 79/12

See application file for complete search history.

(56) References Cited

U.S. PATENT DOCUMENTS

| | | | |
|---|---|---|---|
| 3,998,482 | A | 12/1976 | Nozaki et al. |
| 4,986,579 | A | 1/1991 | Ishikawa |
| 5,466,021 | A | 11/1995 | Ishihara et al. |
| 5,516,164 | A | 5/1996 | Kobayashi |
| 5,738,393 | A | 4/1998 | Chao |
| 5,944,367 | A | 8/1999 | Imaizumi et al. |
| 6,053,542 | A | 4/2000 | Ostrowski et al. |
| 6,349,450 | B1 | 2/2002 | Koops et al. |

(Continued)

*Primary Examiner* — Kristina R Fulton
*Assistant Examiner* — Thomas L Neubauer
(74) *Attorney, Agent, or Firm* — HONIGMAN LLP

(57) ABSTRACT

A vehicular door actuation system for a door of a vehicle includes a handle assembly, a latch and an actuator. The handle assembly includes a handle portion and a base portion. The base portion is disposed at the door of the vehicle and the handle portion is movable between a recessed position, where the handle portion nests at least partially in the base portion, and a ready position, where the handle portion extends from the base portion. The actuator is disposed at the door of the vehicle separate and remote from the handle assembly. A handle linkage operatively couples operation of the actuator to the handle portion to move the handle portion from the recessed position to the ready position. The latch mechanism latches the door in a closed state, and unlatches the door responsive to a user pulling the handle portion from the ready position to open the door.

23 Claims, 16 Drawing Sheets

(56) References Cited

U.S. PATENT DOCUMENTS

| | | | |
|---|---|---|---|
| 6,431,643 B2 | 8/2002 | Grey | |
| 6,433,728 B1 | 8/2002 | Krupp et al. | |
| 6,550,946 B2 | 4/2003 | Misawa et al. | |
| 6,556,125 B1 | 4/2003 | Rohrl | |
| 6,577,228 B1 | 6/2003 | Tsuchida et al. | |
| 6,621,178 B2 | 9/2003 | Morillon | |
| 6,700,476 B1 | 3/2004 | Okada et al. | |
| 6,795,032 B2 | 9/2004 | Ieda et al. | |
| 6,809,630 B1 | 10/2004 | Dreimann et al. | |
| 6,812,823 B2 | 11/2004 | Inaba et al. | |
| 6,847,289 B2 | 1/2005 | Pang et al. | |
| 6,854,870 B2 | 2/2005 | Huizenga | |
| 6,871,887 B2 | 3/2005 | Jooss et al. | |
| 6,977,619 B2 | 12/2005 | March et al. | |
| 7,005,959 B2 | 2/2006 | Amagasa et al. | |
| 7,199,317 B2 | 4/2007 | Teda et al. | |
| 7,210,715 B2 | 5/2007 | Kobayashi et al. | |
| 7,289,037 B2 | 10/2007 | Uken et al. | |
| 7,407,203 B2 | 8/2008 | Huizenga et al. | |
| 7,575,270 B2 | 8/2009 | Nagai et al. | |
| 7,627,986 B2 | 12/2009 | Hirai et al. | |
| 8,052,188 B2 | 11/2011 | Chernoff et al. | |
| 8,333,492 B2 | 12/2012 | Dingman et al. | |
| 8,596,402 B2 | 12/2013 | Abidi | |
| 8,786,401 B2 | 7/2014 | Sobecki et al. | |
| 9,187,936 B2 | 11/2015 | Kim et al. | |
| 9,580,942 B2 | 2/2017 | Sobecki et al. | |
| 9,677,302 B2 | 6/2017 | Coleman | |
| 9,863,170 B2 | 1/2018 | Park et al. | |
| 10,465,425 B2 | 11/2019 | Clark et al. | |
| 10,563,437 B2 * | 2/2020 | Bartels | B60Q 1/2669 |
| 10,731,387 B2 | 8/2020 | Sobecki et al. | |
| 10,731,388 B2 | 8/2020 | Ilea et al. | |
| 10,767,397 B2 | 9/2020 | Ottino et al. | |
| 10,941,592 B2 | 3/2021 | Taurasi | |
| 11,168,498 B2 | 11/2021 | Distefano et al. | |
| 11,306,517 B2 | 4/2022 | Ilea | |
| 2003/0001396 A1 | 1/2003 | Jooss et al. | |
| 2003/0019261 A1 | 1/2003 | Wittwer | |
| 2003/0177796 A1 | 9/2003 | Dimig | |
| 2004/0031301 A1 | 2/2004 | Dominique | |
| 2004/0070489 A1 | 4/2004 | Ueda et al. | |
| 2005/0284201 A1 | 12/2005 | Kachouh et al. | |
| 2006/0066114 A1 | 3/2006 | Oberheide | |
| 2006/0091680 A1 | 5/2006 | Cummins et al. | |
| 2006/0226661 A1 | 10/2006 | Moore | |
| 2007/0182166 A1 | 8/2007 | Schindler et al. | |
| 2008/0021619 A1 | 1/2008 | Steegmann et al. | |
| 2008/0163555 A1 | 7/2008 | Thomas et al. | |
| 2009/0039671 A1 | 2/2009 | Thomas et al. | |
| 2009/0040306 A1 | 2/2009 | Foote et al. | |
| 2009/0115631 A1 | 5/2009 | Foote et al. | |
| 2010/0007463 A1 | 1/2010 | Dingman et al. | |
| 2010/0088855 A1 | 4/2010 | Ruse et al. | |
| 2012/0161456 A1 | 6/2012 | Riedmayr et al. | |
| 2012/0167642 A1 | 7/2012 | Savant et al. | |
| 2013/0121008 A1 * | 5/2013 | Muller | E05B 85/107<br>292/336.3 |
| 2013/0130674 A1 | 5/2013 | De Wind et al. | |
| 2013/0161964 A1 | 6/2013 | Ishida | |
| 2014/0000167 A1 | 1/2014 | Patel et al. | |
| 2014/0047877 A1 | 2/2014 | Bohm et al. | |
| 2015/0233153 A1 | 8/2015 | Smart et al. | |
| 2016/0168883 A1 | 6/2016 | Konchan | |
| 2016/0186468 A1 | 6/2016 | Ilea | |
| 2016/0208523 A1 | 7/2016 | Bingle et al. | |
| 2017/0089105 A1 | 3/2017 | Margheritti et al. | |
| 2017/0167169 A1 | 6/2017 | Sobecki et al. | |
| 2017/0260780 A1 * | 9/2017 | Christensen | E05B 85/103 |
| 2018/0080266 A1 | 3/2018 | Lebsak et al. | |
| 2018/0100331 A1 | 4/2018 | Cumbo | |
| 2018/0187461 A1 * | 7/2018 | Mueller | B60R 25/24 |
| 2018/0218552 A1 | 8/2018 | Helligrath | |
| 2018/0320720 A1 | 11/2018 | Erices et al. | |
| 2019/0003214 A1 | 1/2019 | Cumbo et al. | |
| 2019/0024424 A1 | 1/2019 | Brickner | |
| 2019/0128028 A1 | 5/2019 | Herline et al. | |
| 2019/0145135 A1 | 5/2019 | Lebsak et al. | |
| 2019/0226247 A1 | 7/2019 | Johann et al. | |
| 2019/0292817 A1 | 9/2019 | Tomaszewski | |
| 2019/0301212 A1 | 10/2019 | Digel et al. | |
| 2019/0368237 A1 | 12/2019 | Distefano et al. | |
| 2020/0102773 A1 | 4/2020 | Sobecki | |
| 2020/0199916 A1 | 6/2020 | Cumbo et al. | |
| 2020/0318400 A1 | 10/2020 | Johann et al. | |
| 2021/0238898 A1 | 8/2021 | Lebsak et al. | |

* cited by examiner

DEPLOYABLE HANDLE SYSTEM USING REMOTE ACTUATOR

CROSS REFERENCE TO RELATED APPLICATION

The present application claims the filing benefits of U.S. provisional application Ser. No. 62/782,134, filed Dec. 19, 2018, which is hereby incorporated herein by reference in its entirety.

TECHNICAL FIELD

The present invention relates in general to actuation of vehicle door components.

BACKGROUND

Current deployable flush handle systems include an actuator that is integrated into the handle, which increases the handle packaging in the glass area of the vehicle door and can hinder the design of thinner doors. The integrated actuator format may also cause undesirable constraints to the style and handle position of current flush handle systems. The handle of integrated actuators may be exposed to environmental elements (e.g., water and dirt). Further, integrated actuators may include a handle presentment function having cinching functionality, which may require multiple actuators.

SUMMARY OF THE INVENTION

The present invention provides a vehicular door handle actuation system that includes an actuator that is disposed separate and remote from the handle portion and that operates to move the handle portion from a non-use or recessed or retracted position to a deployed or extended or ready position, where a user can grasp the handle portion and pull at the handle portion to open the vehicle door. The actuator may also control the latch mechanism of the vehicle door, such as to cause the latch mechanism to release to allow the door to open and/or such as to control a cinch mechanism to draw the door to a fully closed or fully latched state or position when the door is partially closed.

In accordance with an aspect of the present invention, a vehicular door actuation system for a door of a vehicle includes a handle assembly including a handle portion and a base portion, with the base portion disposed at the door of the vehicle and the handle portion movable between a recessed position, where the handle portion nests at least partially in the base portion, and a ready position, where the handle portion extends from the base portion. An actuator is disposed at the door separate and remote from the handle assembly, with a handle linkage operatively coupling operation of the actuator to the handle portion to move the handle portion from the recessed position to the ready position. A latch mechanism is configured to latch the door in a closed state, and the latch mechanism is configured to unlatch the door responsive to a user pulling the handle portion from the ready position to allow the door to open.

The actuator may be located separate and remote from the latch mechanism. The actuator, responsive to the user pulling the handle portion from the ready position, may operate to control the latch mechanism to unlatch the door and to allow the door to move to an opened position. The actuator, responsive to the door being moved from the opened position to a partially closed position, may operate to control the latch mechanism to adjust the door from the partially closed position to a fully closed position.

These and other objects, advantages, purposes and features of the present invention will become apparent upon review of the following specification in conjunction with the drawings.

BRIEF DESCRIPTION OF THE DRAWINGS

The non-limiting embodiments may be more fully appreciated by reference to the following detailed description of the non-limiting embodiments when taken in conjunction with the accompanying drawings, by example only, in which.

DETAILED DESCRIPTION

Figure 1:
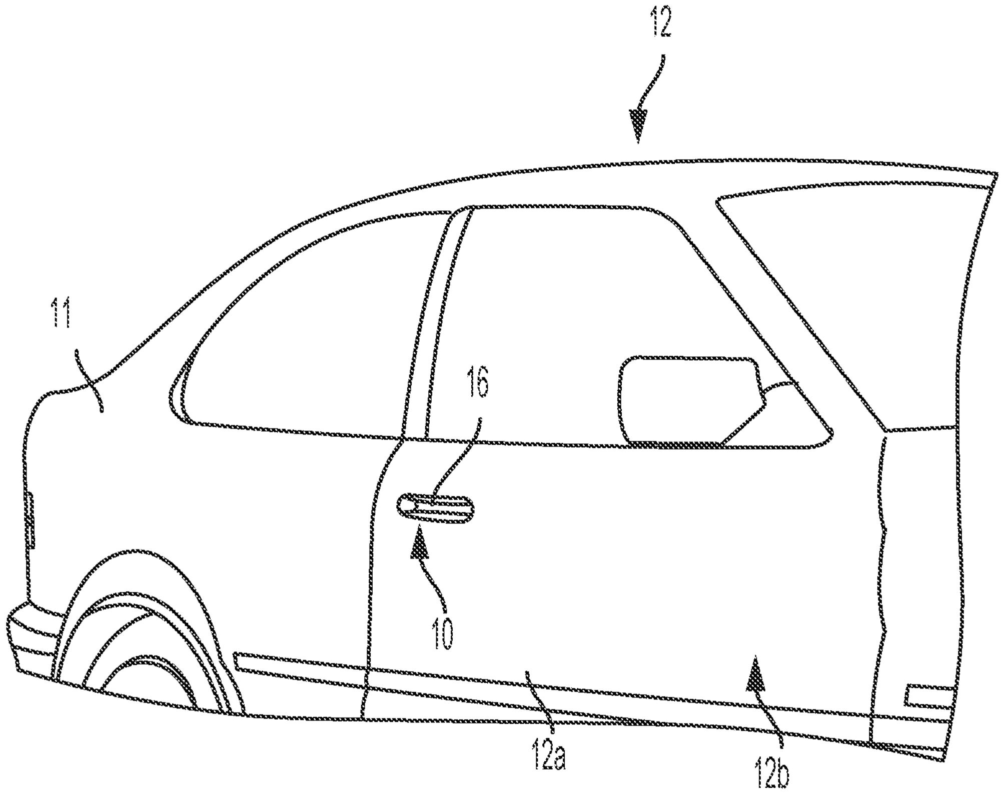
FIG. 1 is a perspective view of an exemplary vehicle including a flush mounted handle in accordance with the principles of the present disclosure.
Figure 2:
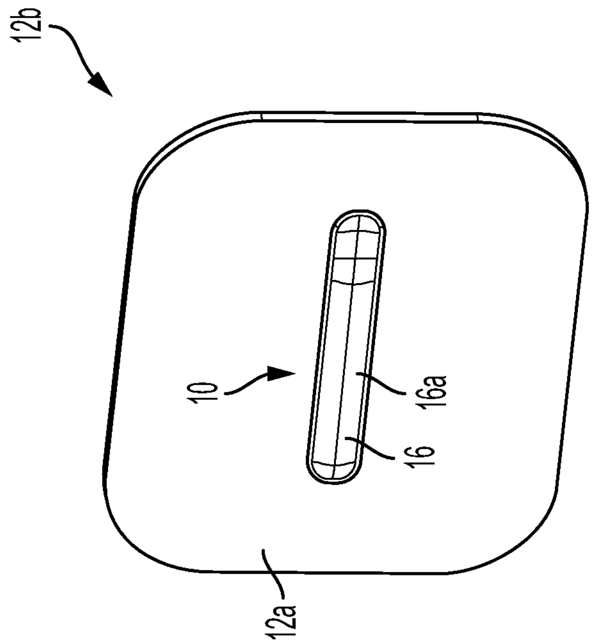
FIG. 2 is a perspective view of the handle of FIG. 1.

Referring now to the drawings and the illustrative embodiments depicted therein, a vehicle handle assembly or module or unit or extendable flush door handle assembly 10 is mountable to a door 12*a* (e.g., a closure panel 12*a*) of a vehicle 12 and operable to release a latch mechanism of the door 12*a* to open the vehicle door (see FIG. 1). The vehicle 12 includes a body 11, which may also be referred to as a frame (e.g., of the vehicle 12 and/or of the individual doors 12*a* as desired). Referring to FIG. 2, the handle assembly 10 includes a base portion or bracket 14 that is mountable to the door 12*a* (or otherwise integrated into a door assembly 12*b*, such as, but not limited to, a door frame with interior and exterior panels) and a handle or strap portion 16 that is pivotally mounted to the base portion 14. When not in use, the handle portion 16 is at an initial rest or recessed or non-use position and is received or disposed at or partially in base portion 14 so that an outer surface 16*a* of the handle portion 16 is generally flush with or generally coplanar with (or protruding only slightly from or recessed slightly from) an outer surface 14*a* of the base portion 14 of the door assembly 12*a*, whereby the handle portion 16 is not readily usable by a user.

Figure 4:
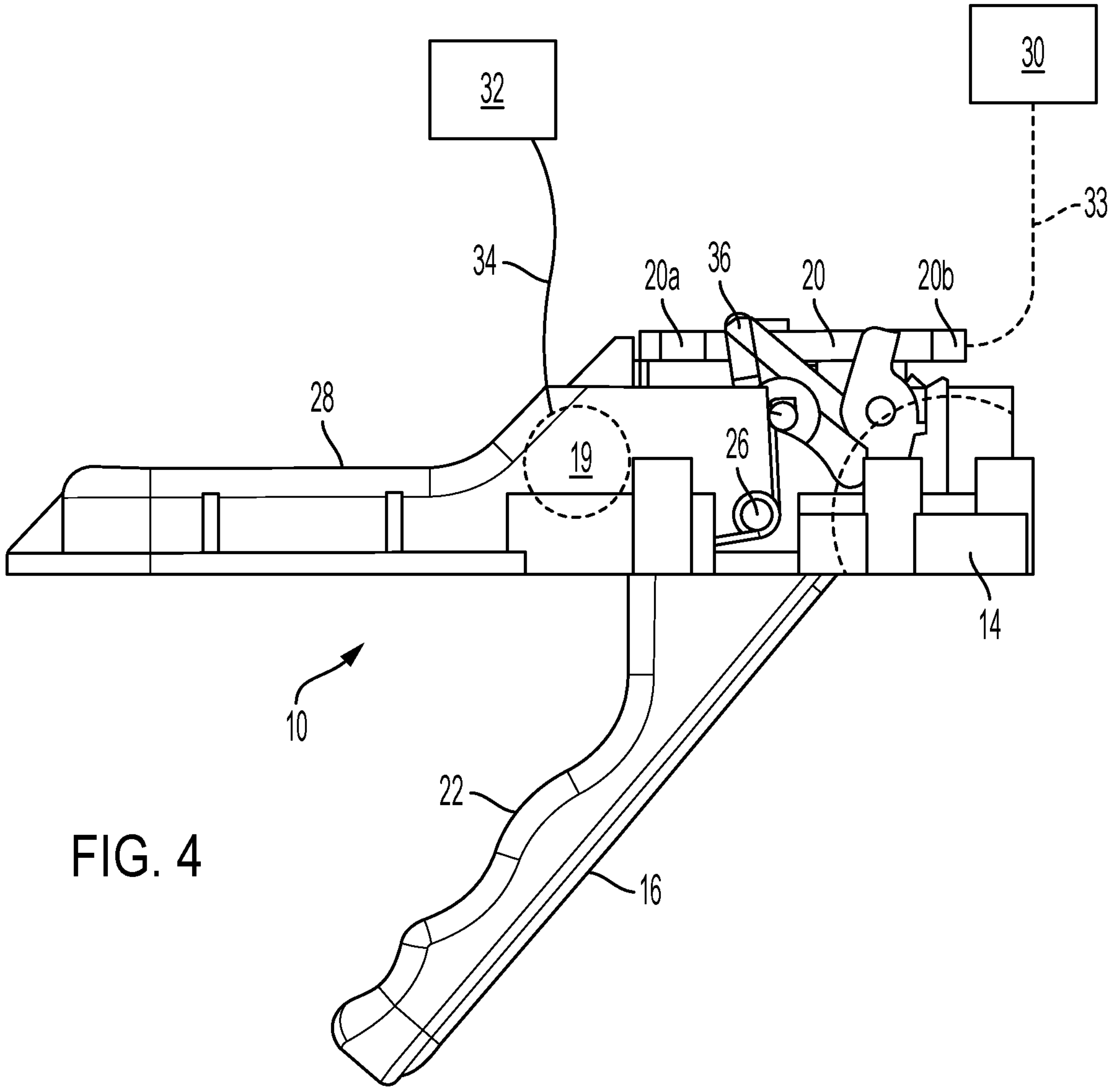
FIG. 4 is another view of the handle of FIG. 3, shown in a ready position.

Referring to FIG. 4, the handle portion 16 may be electromechanically pivotable or movable or laterally movable relative to the door 12*a* and the base portion 14, in order to move to a ready (or operational or graspable or graspable or person-operable) position and the handle portion 16 may then be graspable by a user and may be manually moved (such as via pulling by the user) to actuate a lever 20 (or member or arm) connected to the base portion 14, which in turn moves a latch linkage 33 (e.g., cable or rod or the like) connected to coupling location 20*b* to actuate or release a latch mechanism 30 of the door 12*a* to open the door 12*a*. The handle assembly 10 is coupled to an electrically operable or electromechanical actuator 32 (which may be, for example, separate and remote from and spaced from the handle assembly 10) for imparting the movement of the handle portion 16 relative to the base portion 14 (such as automatically imparting such handle movement in response to a signal from a key fob or a passive entry system or the like) so that the handle portion 16 is automatically moved from the recessed position to the ready (or graspable) position where the user can grasp the handle portion 16 to pull or move the handle portion 16 for unlatching and/or opening the door 12*a* and/or the like, as discussed below. The actuator 32 is coupled to the handle portion 16 of the handle assembly 10 by a handle linkage 34 (e.g., cable or rod), via a coupling mechanism 19 as further described below. For example, the base portion 14 can be a housing of the handle assembly 10. Alternatively, the base portion 14 can be part of the door 12*a* and/or the vehicle 12 in general.

The handle assembly 10 may comprise any suitable type of handle assembly, and may include or incorporate aspects of the door handle assemblies as known. Optionally, aspects of handle assembly 10 may be suitable for use with a lift gate handle assembly for a lift gate (e.g., closure panel 12*a*) or tailgate (e.g., closure panel 12*a*) of the vehicle 12, while remaining within the spirit and scope of the described embodiments.

In the illustrated embodiment, the handle portion 16 can include a grasping portion 22 for the user to grab and pull at to open the door 12*a*. The handle portion 16 has a base end 24 that is pivotally mounted to the base portion 14 via a pivot pin 26, with the grasping portion 22 extending from the base end 24 and along a handle receiving portion 28 of the base portion 14. The handle portion 16 has an arm 36 extending from the base end 24 for engaging and actuating or moving the lever 20 when the handle portion 16 is moved to open the door 12*a*.

Figure 5:
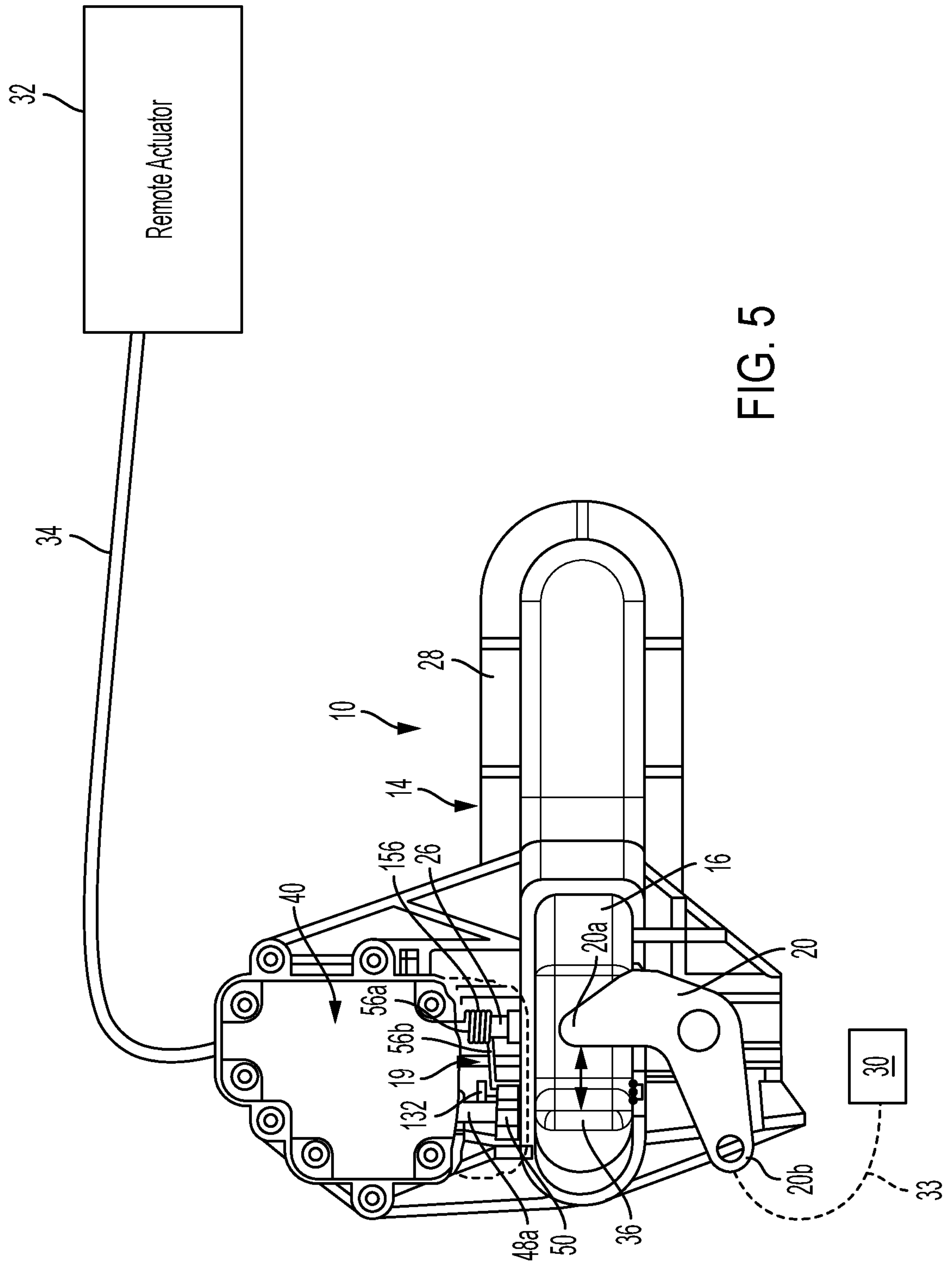
FIG. 5 is another plan view of the handle of FIG. 1, shown connected to a schematic representation of an exemplary remote actuator.

Referring to FIG. 5, a housing portion 40 (having a portion removed as shown by ghosted view for illustration purposes only) of the base portion 14 contains a coupling mechanism 19 connecting the handle linkage 34 to the base portion 24 of the handle portion 16, such that actuation of the coupling mechanism 19 by the handle linkage 34 causes the handle portion 16 to extend from the recessed position to the ready position, as shown in FIG. 4.

Figure 6:
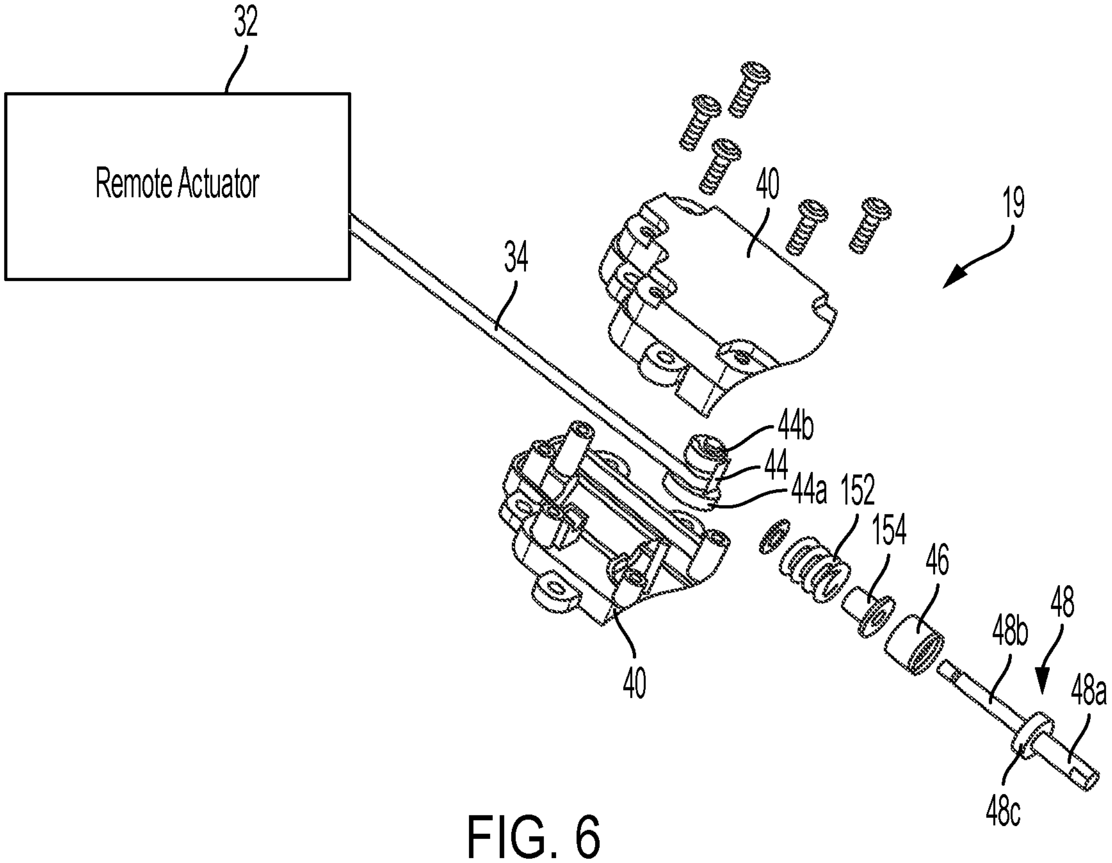
FIG. 6 is an exploded view of a portion of the handle of FIG. 1, shown connected to the schematic representation of the remote actuator of FIG. 5.

Referring to FIGS. 5 and 6, an exemplary coupling mechanism 19 is generally shown. A gear member 44 is attached to the handle linkage 34 of the actuator 32 via an attachment point 44*a*. The gear member 44 has a gear portion 44*b* for engaging another gear element 46 that is disposed on an output shaft 48. The gear portion 44*b* may have a helical configuration or any other suitable configuration. The output shaft 48 is rotatably mounted to the housing portion 40 and has an engaging end 48*a* that extends from the housing 40 for engaging an actuating element 50, discussed below. A biasing element or spring 152 and an engaging element 154 are disposed on the output shaft 48 and at a mounting end 48*b* of the output shaft 48 to bias or urge or maintain gear element 46 against a collar portion 48*c* of the output shaft 48 so that the output shaft 48 rotates with the gear element 46 when the gear member 44 is actuated (e.g., rotated) by movement of the handle linkage 34, thus operating the coupling mechanism 19. It is also recognized that a biasing element can be used to bias the coupling mechanism 19 to a handle recessed position (i.e., the handle portion 16 is in the recessed position), whereas the movement of the handle linkage 34 by the remote actuator 32 acts against the bias of the biasing element and thus operates the coupling mechanism 19 to move the handle portion 16 from the recessed position to the ready position, as shown in FIG. 4.

Thus, when the handle linkage 34 is operated (e.g., actuated by the remote actuator 32) to rotate gear member 44, the gears 44*b*, 46 cooperate to impart a corresponding rotation of the keyed end 48*a* of the output shaft 48. The keyed end 48*a* is non-rotatably or fixedly received in the actuating element 50 in order to rotate actuating element 50. In the illustrated embodiment, the actuating element 50 engages the guide pin 132, which protrudes from base end 24 of handle portion 16, and, responsive to rotation of the actuating element, imparts movement of the guide pin 132, which in turn imparts (e.g., a pivotal) movement of handle portion 16 about the pivot pin 26 and thus from the recessed position toward and into the ready position.

In the illustrated embodiment, the biasing element 156 (such as a torsional spring or the like) has one end 56*a* that engages base portion 14 and an opposite or biasing end 56*b* that engages the guide pin 132 to bias or urge guide pin 132 towards an initial position and, thus, to bias or urge the handle portion 16 towards its recessed position. When the coupling mechanism 19 is actuated to pivot the actuating element 50 to move the guide pin 132, the guide pin 132 is moved against the biasing force of the biasing element 156 to move the handle portion 16 to its ready position, whereby extension of the base end 24 of the handle portion 16 is moved towards engagement with actuating lever 20 at a handle engaging portion 20*a*. Further pivotal or pulling movement of the handle portion 16 (such as by the user grasping the grasping portion of the handle and pulling outward away from the door) urges arm 36 against the handle engaging portion 20*a* of lever 20 to pivot or move the lever 20 to open the door 12*a*.

Figure 7B:
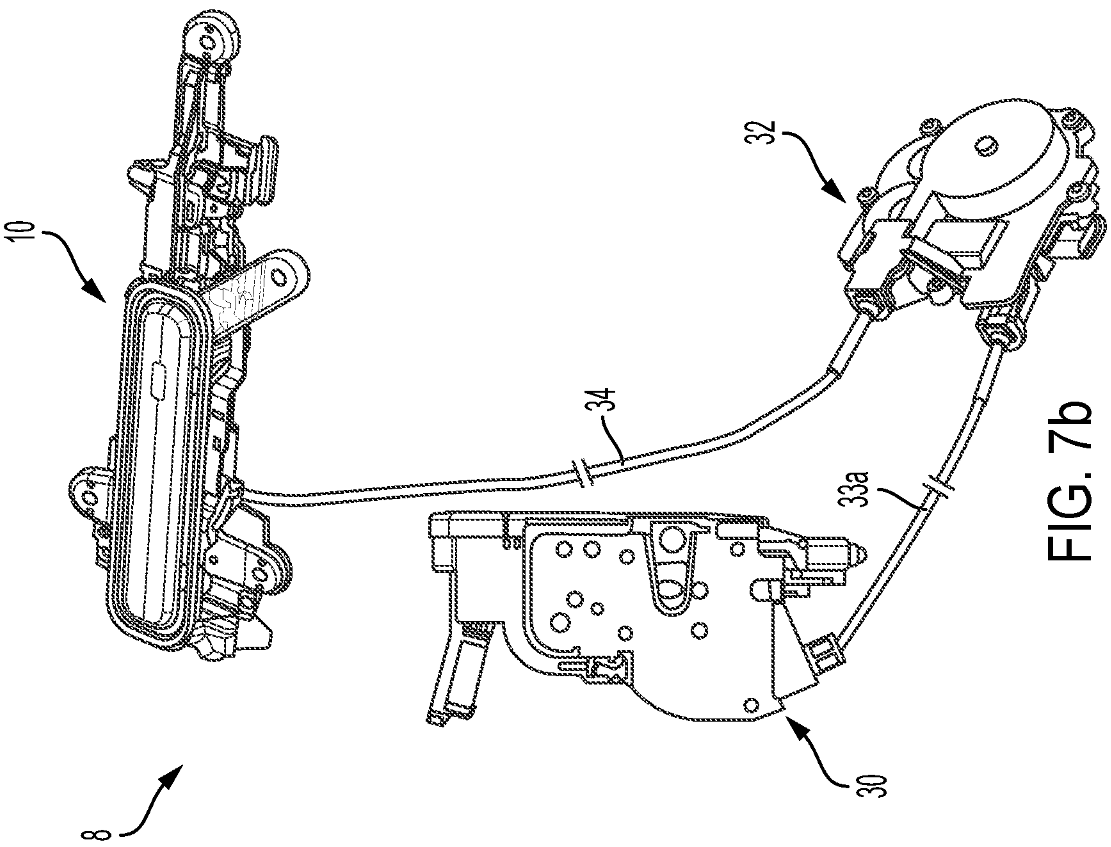
FIG. 7*b* is a perspective view of the actuation system and handle of FIG. 7*a;*
Figure 7A:
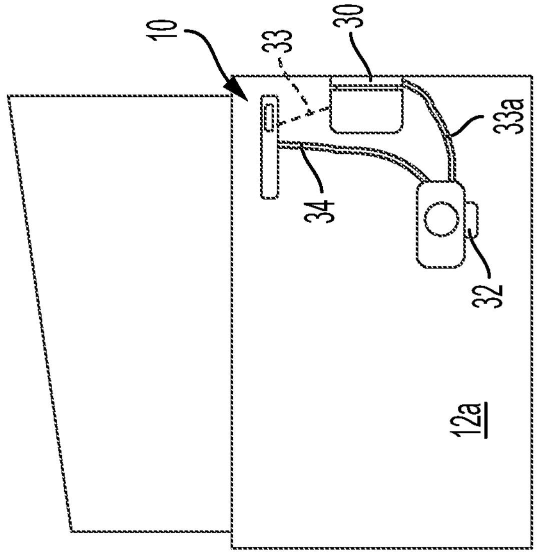
FIG. 7*a* is a side plan view of an exemplary vehicle door including an actuation system and the handle of FIG. 1.

Referring to FIGS. 7*a*, 7*b*, a first embodiment of the handle assembly 10 in relation to the latch 30 and the remote actuator 32 is shown. The actuator 32 is mounted on the door 12*a* of the vehicle, such as on the frame of the door 12*a*, or optionally may be mounted at any suitable location on the body 11 of the vehicle. As such, operation of the actuator 32 can be performed separately with respect to each of the independent systems of the latch 30 and the handle assembly

Figure 3:
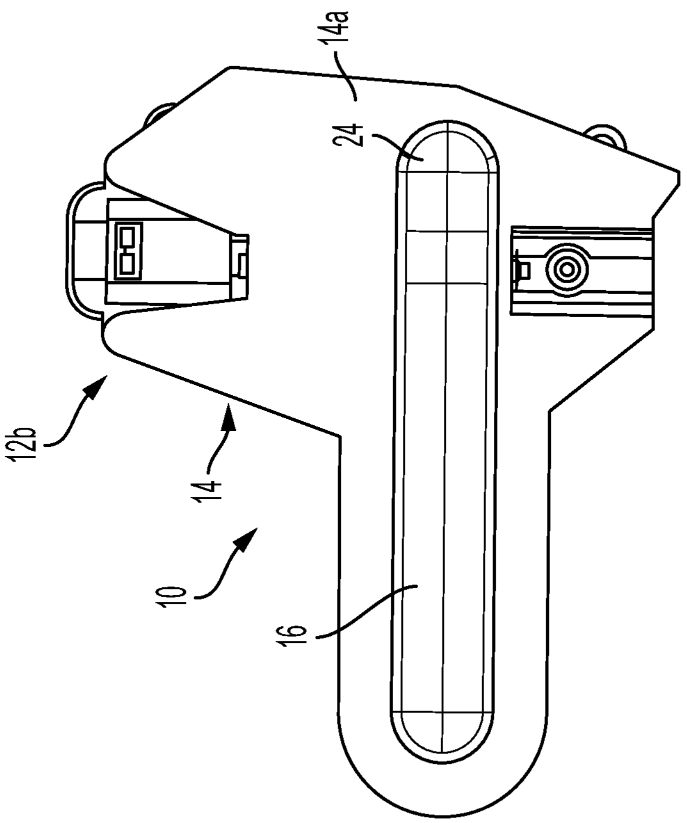
FIG. 3 is a plan view of the handle of FIG. 1.
Figure 11:
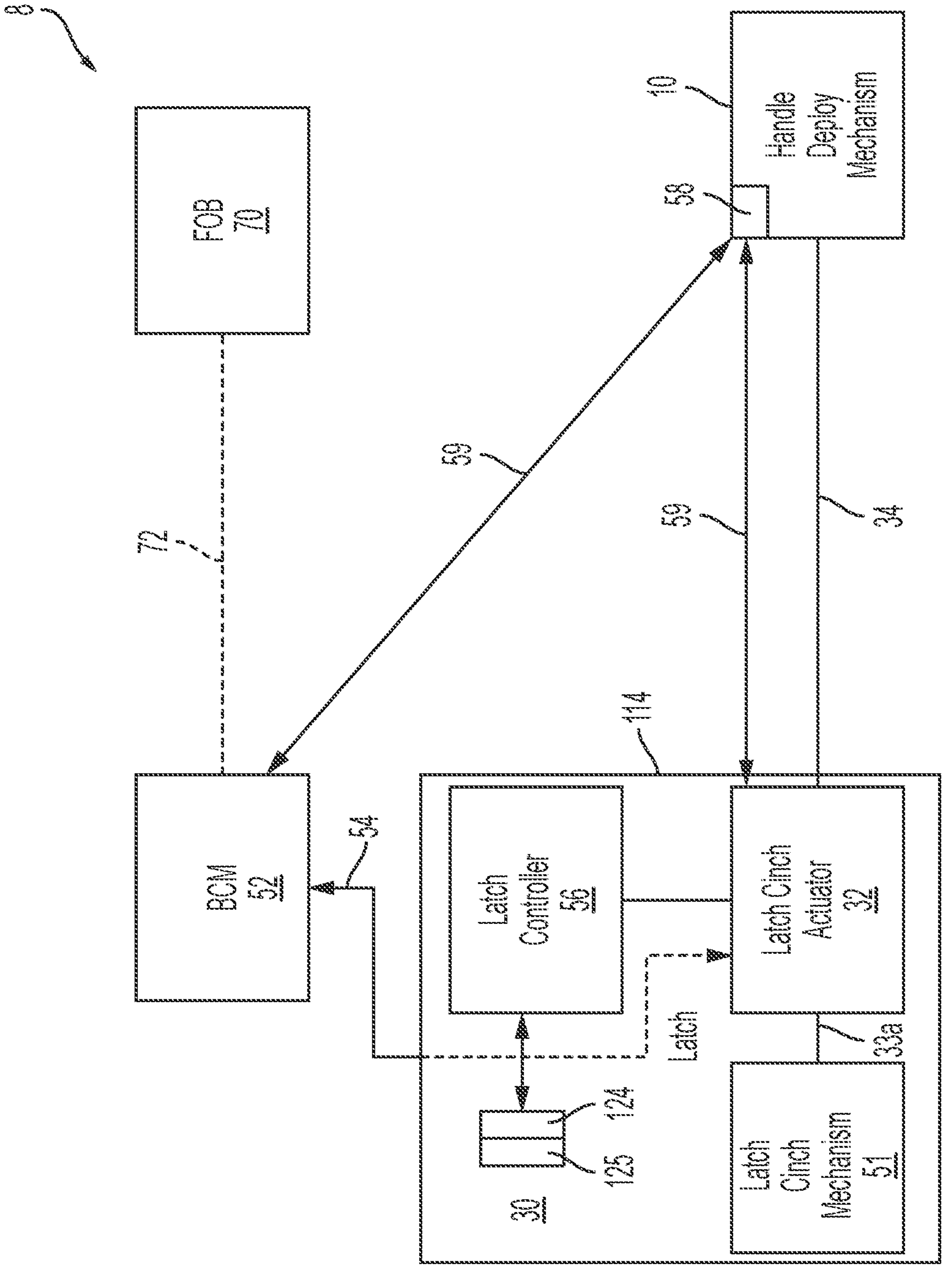
FIG. 11 is an exemplary schematic representation of the actuation system and handle of FIGS. 10*a* and 10*b;*

10. For example, the actuator 32 can be operated first (i.e., independently of the latch 30) in order to automatically position the handle portion 16 (see FIG. 4) from the recessed position to the ready position. Once the handle portion 16 is gripped and further moved (e.g., pivoted) by the user, the latch linkage 33 is operated by the user movement of the handle portion 16 in order to release a pawl 125 of the latch 30 (see FIG. 8*a*) and thus release a ratchet 124, in order to allow a striker 7 to be removed from the ratchet 124 as the door 12*a* is opened by the user, e.g., manually and/or automatically via a door presentment system. Once the handle portion 16 has been used by the user to open the door 12*a* and the user lets go of the handle portion 16, the biasing element 156 (see FIG. 5) can be used to bias the handle portion 16 back to the recessed position (see FIG. 3) in the handle receiving portion 28 of the base portion 14. The latch 30, the handle assembly 10 and the actuator 32 can be provided as an actuator system 8 for the door 12*a* (see FIGS. 9 and 11). It is recognized that a remote transmitter or key fob 70 and/or the sensors 58 (e.g., proximity sensors, touch sensors, etc., as shown in FIGS. 9 and 11) associated with the handle assembly 10 can be used to send a presentment signal to the vehicle controller 52 and/or the actuator 32, in order to instruct the actuator 32 to operate the handle portion 16 from the recessed position to the ready position. It is further recognized that the latch controller 56 can be configured directly in communication with remote actuator 32 and sensor 58 to control the remote actuator in a manner as described herein, as illustrated in FIG. 9A.

Figure 8A:
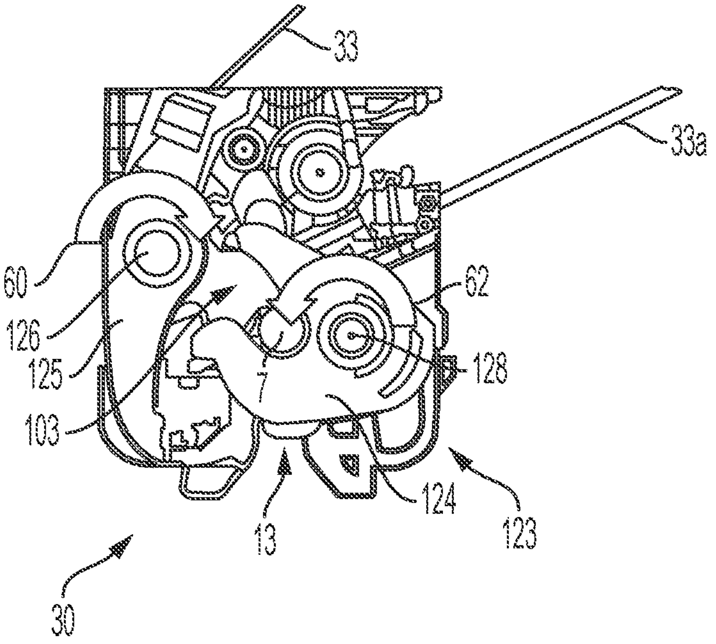
FIG. 8*a* is a plan view of an exemplary latch of the vehicle of FIG. 1.
Figure 8B:
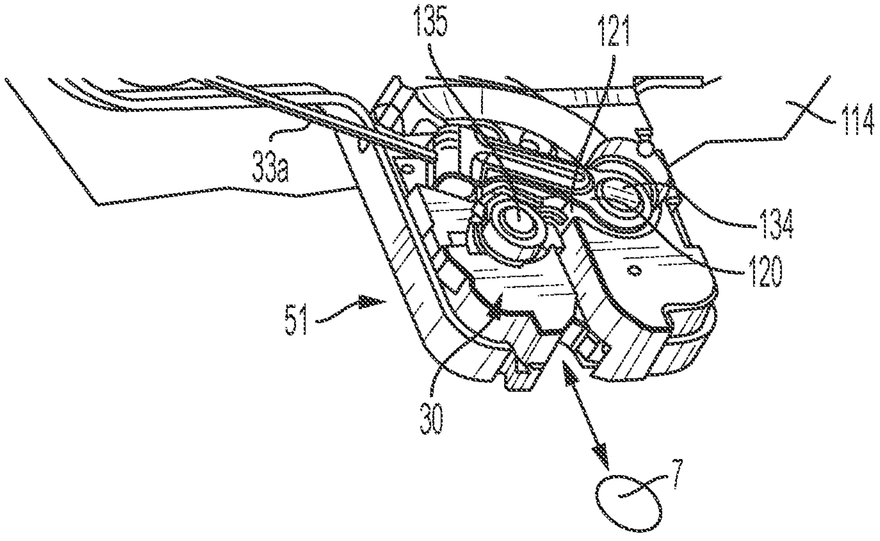
FIG. 8*b* is rear perspective view of the latch of FIG. 8*a;*
Figure 9:
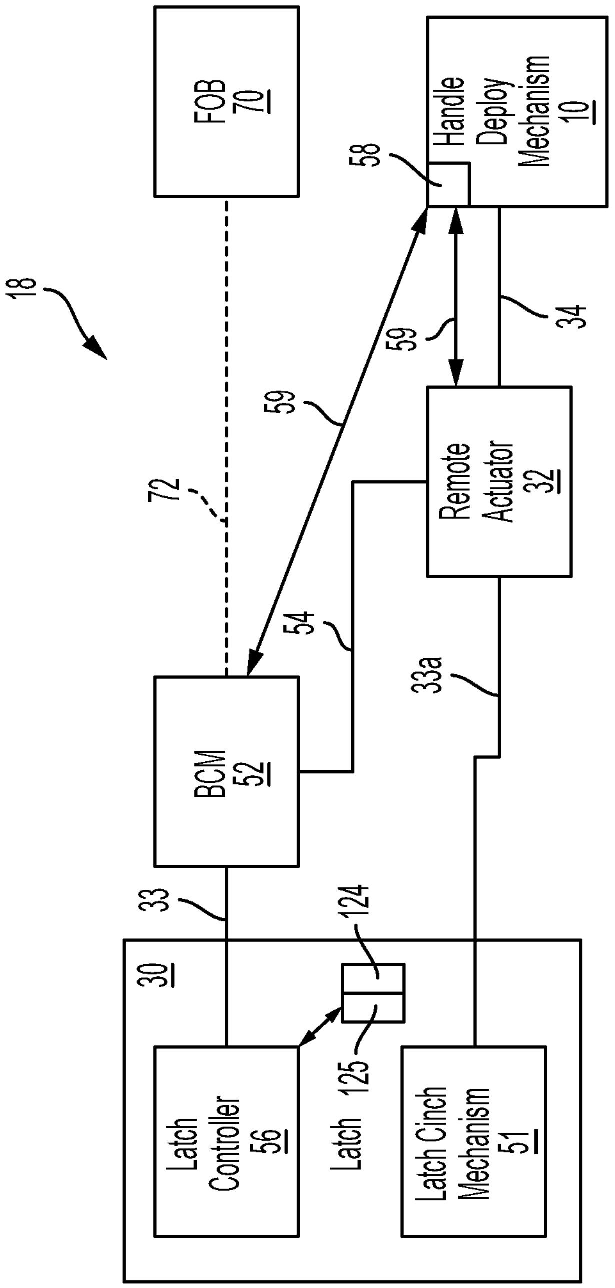
FIG. 9 is an exemplary schematic representation of the actuation system and handle of FIGS. 7*a* and 7*b;*
Figure 9A:
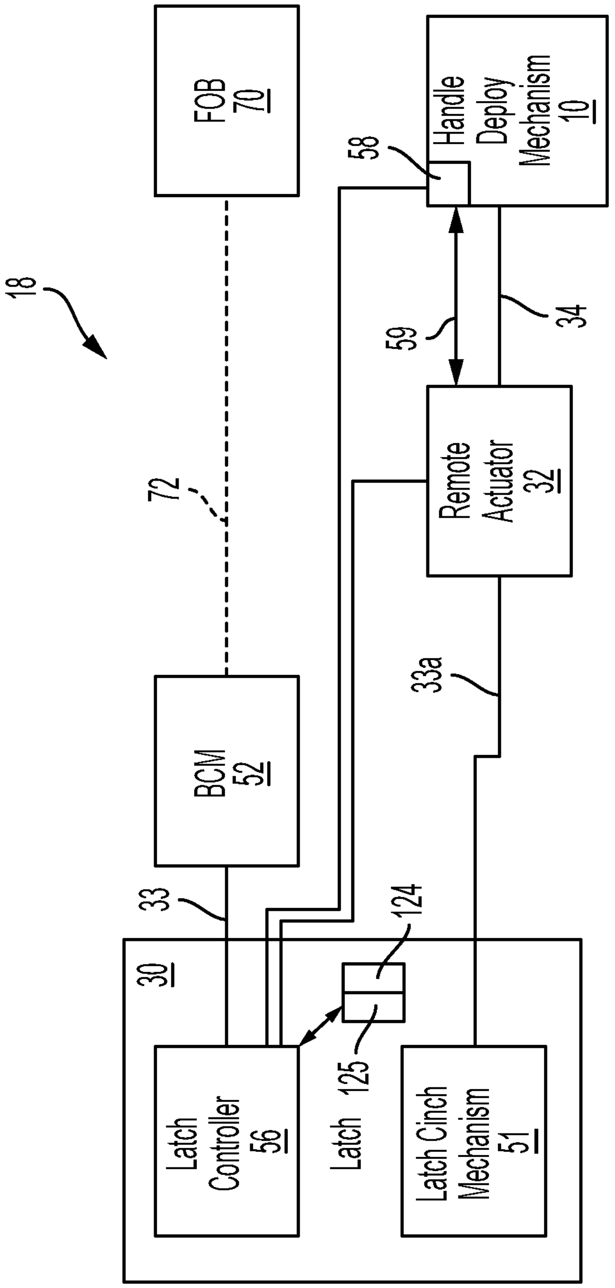
FIG. 9*a* is another exemplary schematic representation of the actuation system and handle of FIGS. 7*a* and 7*b;*

Referring to FIGS. 8*a*, 8*b*, an example configuration of the latch 30 is shown having a frame 114 mounted on the door 12*a*. The latch 30 is oriented on the door 12*a* so as to be aligned to engage the mating latch component (e.g., striker 7). An actuator linkage 33*a* (e.g., cinch linkage 33*a*) is coupled to a member 120 (e.g., cinch arm) and also to one or more latch components 123, e.g., a ratchet 124 and/or a pawl 125 as further described below. As such, the member 120 can be actuated (e.g., pulled) by the actuator linkage 33*a* to operate the door 12*a* from a partially closed position to a fully closed position, (e.g., a cinched position), as the member 120 can be coupled to the ratchet 124 via a cinch lever arm 121. For example, the member 120 is connected to the cinch arm 121 by pivot 134 and the cinch arm 121 can be coupled to the ratchet 124 by pin 135. It is also recognized that the actuator linkage 33*a* can be provided as a rigid linkage rather than as a flexible linkage involving cables. For example, the actuator linkage 33*a* may be embodied as a sector gear (or other series of rigid members) connected to the member 120 and/or the cinch lever 121 at one end of the actuator linkage 33*a*, referred to as a latch cinch mechanism 51.

The latch 30 includes the number of latch elements 123 (e.g., ratchet 124, actuator linkage 33*a*, cinch lever 121, and pawl 125) that are configured to cooperate with the striker 7 in order to retain the striker 7 within a slot 13 when the door 12*a* is in the closed or latched position (e.g., locked), or otherwise to drive the striker 7 out of the slot 13 when the door 12*a* is moved towards the open or unlatched position. The slot 13 is sized for receiving the striker 7 therein, in other words the slot 13 of the latch 30 cooperates with a slot 103 of the ratchet 124. The slot 13 has an open top end and a closed bottom end as shown. The latch elements 123 of the ratchet 124 and pawl 125 are pivotally secured to the frame 114 via respective shafts 128, 126. Note that in FIG. 8*a*, the latch 30 with associated ratchet 124 is shown in the fully or primary closed position (e.g., a cinched position). Rotation (see arrow 60 in FIG. 8*a*) about shaft 126 causes the pawl 125 to release the ratchet 124, thus allowing the ratchet 124 to rotate (see arrow 62 in FIG. 8*a*) about the shaft 126 and thus release the striker 7 from both the slot 13 and the slot 103. Contrary to the opening sequence of the latch 30, once the striker 7 is subsequently received in the slots 13,103 upon closing of the door 12*a*, actuation of the actuator linkage 33*a* (by the actuator 32) causes movement of the member 120 and coupled cinch lever arm 121 in order to rotate the ratchet 124 about the shaft 128 counter to the rotation 62, as shown, and thus cinch the striker 7 within the slots 13,103.

Referring to FIG. 9, shown is an alternative component diagram of the embodiment of FIGS. 7*a*, 7*b*. In this example, the latch 30 has the latch cinch mechanism 51 coupled to the actuator 32 via actuator linkage 33*a*. The handle assembly 10 is also coupled to the actuator 32 by handle linkage 34. The actuator 32 could also be coupled to a vehicle controller 52 via electronic signal connection 54, such that the actuator 32 could communicate with the vehicle controller 52 in order to instruct a latch controller 56 of the latch 30 to release the pawl 125 (see FIG. 8*a*). In this example configuration, the latch linkage 33 can be electronic, such that sensors 58 in communication 59 with the actuator 32 can instruct the actuator 32 that the handle portion 16 (see FIG. 4) has been operated by the user and thus signals that the latch 30 should be unlatched (e.g., an electronic open signal command may be communicated by the vehicle controller 52 using the electronic communication form of the latch linkage 33). It is also recognized that a remote transmitter or key fob 70 may be used by the user to electronically activate the latch 30, via instructing the vehicle controller 52, using a wireless communication 72 (as received by the vehicle controller 52). FIG. 9 demonstrates an electronic operation of the latch 30 (e.g., as an e-Latch). It is recognized that the fob 70 and/or the sensors 58 (e.g., proximity sensors, touch sensors, etc.) associated with the handle assembly 10 can be used to send a presentment signal to the vehicle controller 52 and/or the actuator 32, in order to instruct the actuator 32 to operate the handle portion 16 from the recessed position to the ready position.

Figure 10B:
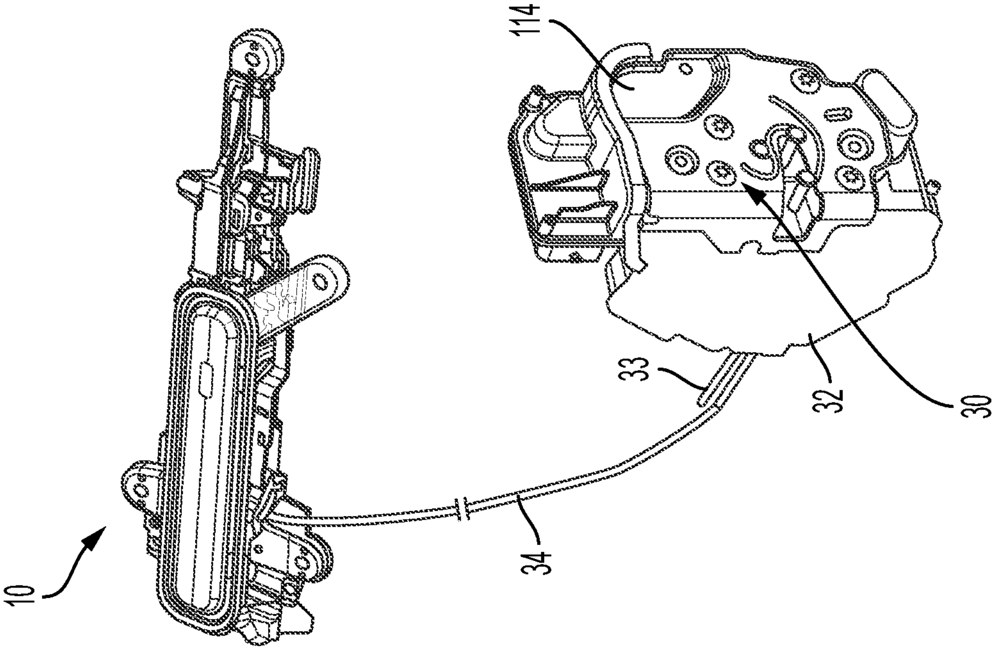
FIG. 10*b* is a perspective view of the actuation system and handle of FIG. 10*a;*
Figure 10A:
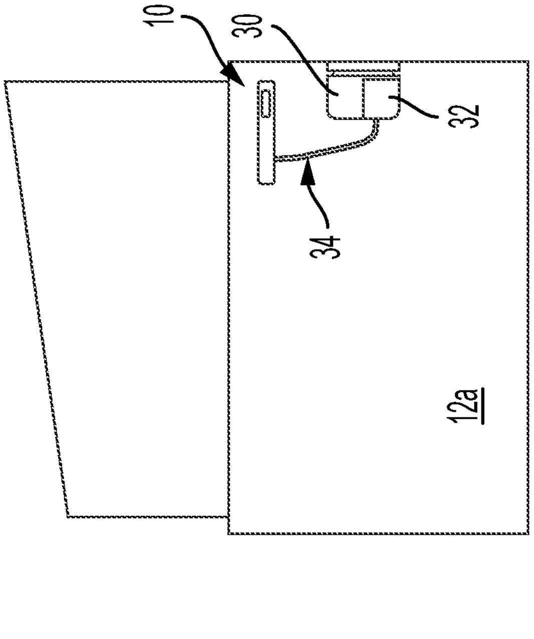
FIG. 10*a* is a plan view of another exemplary vehicle door including an actuation system and the handle of FIG. 1.

Referring to FIGS. 10*a* and 10*b*, a further embodiment is shown with the actuator 32 mounted on or otherwise in the housing 114 of the latch 30. Accordingly, the actuator 32 is remote from the handle assembly 10 mounted at a portion of the door 12*a* and spaced apart from the mounting of the latch 30 (with co-mounted actuator 32) at a different portion of the door 12*a*. As such, the handle linkage 34 is used to couple the actuator 32 function with the handle assembly 10, i.e., bridge the spacing between the handle assembly 10 and the combined actuator 32 with latch 30 of the housing 114.

Referring to FIG. 11, an alternative component diagram of the embodiment of FIGS. 10*a* and 10*b* is shown. In this example, the latch 30 has the latch cinch mechanism 51 coupled to the actuator 32 via actuator linkage 33*a*. The handle assembly 10 is also coupled to the actuator 32 by handle linkage 34. The actuator 32 could also be coupled to a vehicle controller 52 via electronic signal connection 54, such that the actuator 32 may communicate in conjunction with the vehicle controller 52 in order to instruct the latch controller 56 of the latch 30 to release the pawl 125 (see FIG. 8*a*). In this example configuration, the latch linkage 33 may be electronic, such that sensors 58 are in communication 59 with the actuator 32 (and/or the vehicle controller 52) to instruct the actuator 32 that the handle portion 16 (see FIG. 4) has been operated by the user and thus signals that the latch 30 should be unlatched, e.g., an electronic open signal command could be communicated by the vehicle controller 52 using the electronic communication form of the latch linkage 33 (see FIG. 4). It is also recognized that the remote transmitter or fob 70 could be used by the user to electronically activate the latch 30, via instructing the vehicle controller 52, using a wireless communication 72 (as received by the vehicle controller 52). FIG. 11 demonstrates an electronic operation of the latch 30 (e.g., as an e-Latch). It is recognized that the fob 70 and/or the sensors 58 (e.g., proximity sensors, touch sensors, etc.) associated with the handle assembly 10 can be used to send a presentment signal to the vehicle controller 52 and/or the actuator 32, in order to instruct the actuator 32 to operate the handle portion 16 from the recessed position to the ready position.

Figure 12:
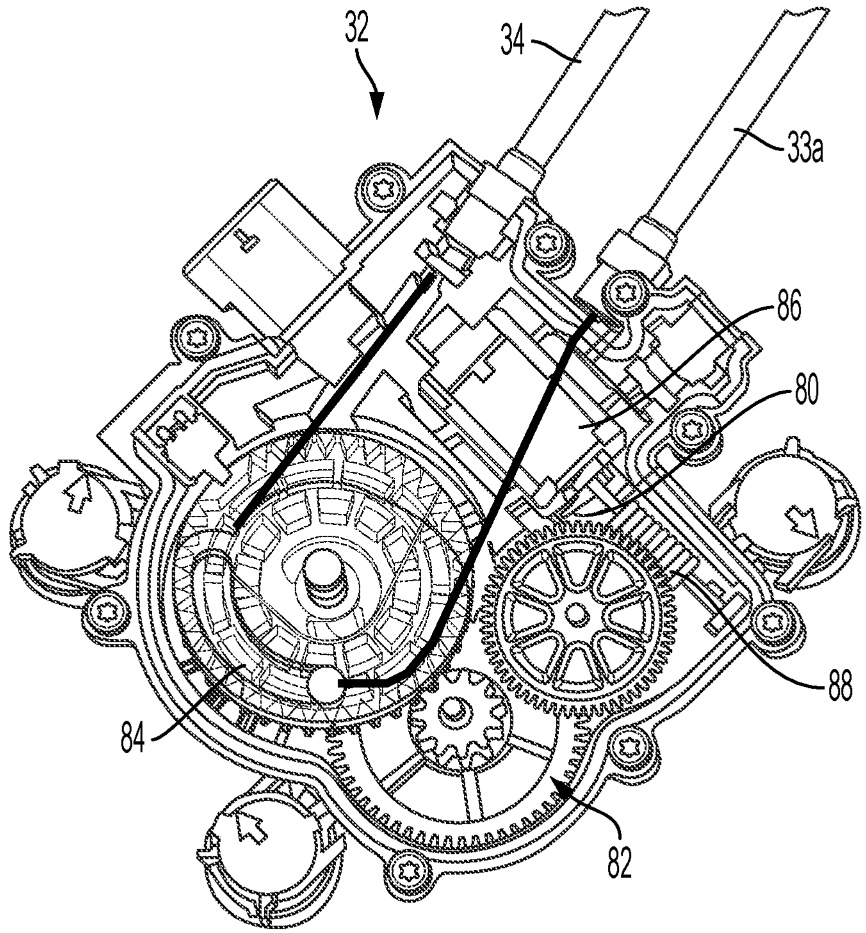
FIG. 12 is a plan view of the actuator of FIGS. 7*a* and 7*b;*
Figure 13A:
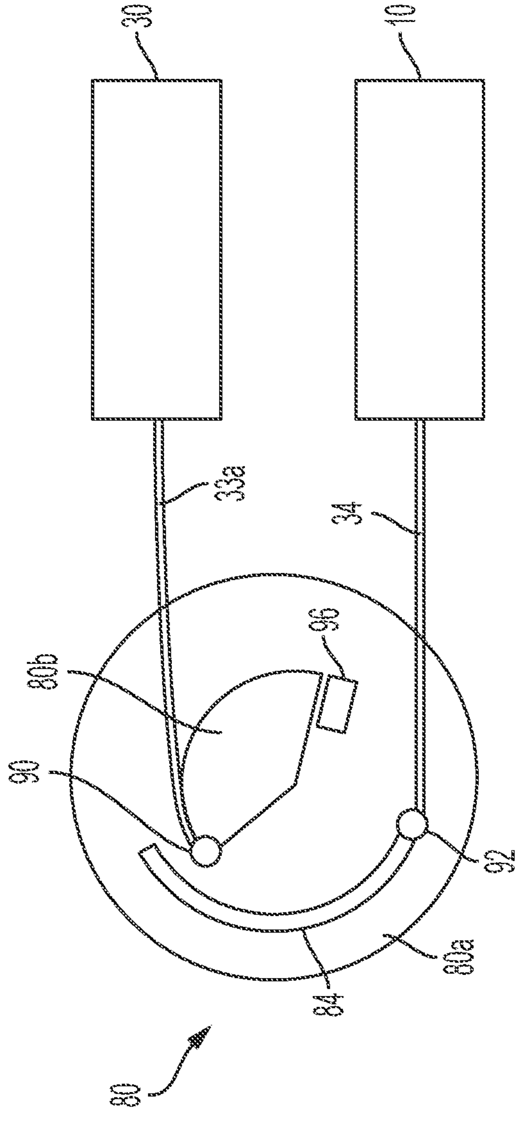
FIG. 13*a* is a plan view of an exemplary configuration of the actuator of FIG. 12.
Figure 13B:
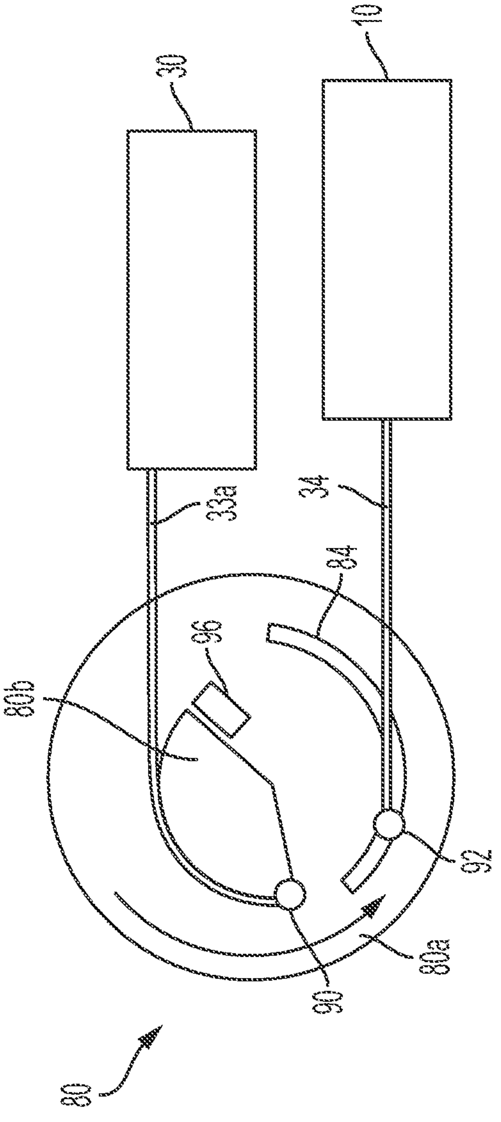
FIG. 13*b* is a plan view of an exemplary operative configuration of the actuator of FIG. 12.
Figure 13C:
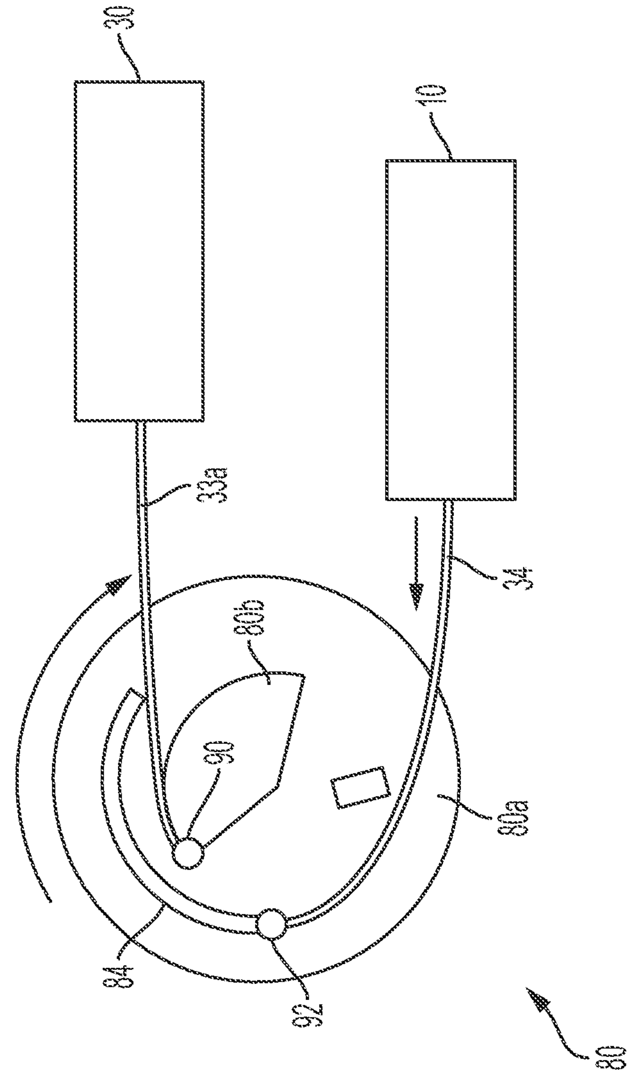
FIG. 13*c* is a plan view of another exemplary operative configuration of the actuator of FIG. 12.

Referring to FIG. 12, shown is an example configuration of the actuator 32 having a dual cam lost motion mechanism 80, as coupled to the handle linkage 34 and the actuator linkage 33*a*. For example, the mechanism 80 can have a plurality of gears 80 having slots 84, in order to facilitate one of the cables 33*a*, 34 being actuated independently of the other during operation of the actuator 32. For example, shown is an electric motor 86 coupled to the plurality of gears 80 via a drive gear 88 (e.g., worm gear). Referring to FIGS. 13*a*-13*c*, the gear 80 is connected to the linkages 33*a*, 34 by respective attaching or connecting locations 90, 92. FIG. 13*a* shows the mechanism 80 at rest. In example operation, as shown in FIG. 13*b*, as the large gear 80*a* is rotated counter clockwise, a tab 96 also urges the small gear 80*b* to also rotate counter clockwise. In the example shown, the latch 30 is operated by movement of the actuator linkage 33*a* (caused by movement of the small gear 80*b* via mounting location 90 also moving therewith), while the handle assembly 10 remains unactuated as the mounting location 92 (connected to the gear 80*a*) riding the slot 84 and thus inhibits actuation of the handle linkage 34. Thus, the actuator operates to control the latch mechanism, such as to cinch or fully close and fully latch the door when the door is partially closed. FIG. 13*c* shows, in a clockwise rotation of the gears 80, where the mounting location 92 is engaged by the slot 84 and thus actuates the handle assembly 10 while the tab 96 does not engage the gear 80*b* and thus the actuator linkage 33*a* does not actuate the latch 30. Thus, the actuator operates to move the handle portion to the ready position without affecting the latch mechanism. As can be seen with reference to FIG. 13*a*, if the handle portion (when in the ready position) is pulled by a user to open the door, pulling at cable or linkage 34 may cause rotation of gear and will pull at the linkage 33*a* to unlatch the door to allow the user to open the door.

In view of the above described embodiments, presented are embodiments including: (i) distancing the actuator 32 from the handle assembly 10 in order to facilitate better packaging and reduce style and handle positioning constraints; (ii) providing a single actuator 32 that is shared in order to manage/control both the latch 30 specific functions (e.g., cinching) and the handle deployment functions (e.g., movement of the handle portion 16 from the recessed to the ready position); (iii) providing a single actuator 32 positioned remotely from both the latch 30 and the handle assembly 10 that can control the cinch function of the latch 30 and the handle deployment of the handle assembly 10; (iv) providing a single actuator 32 integrated into the latch 30 that controls the cinch function of the latch 30 and the handle deployment of the handle assembly 10; and/or (v) providing a single actuator 32 integrated into the latch 30 that controls the LOCK/UNLOCK function of the latch 30, including optionally any cinching functionality, and the handle deployment of the handle assembly 10.

Figure 14:
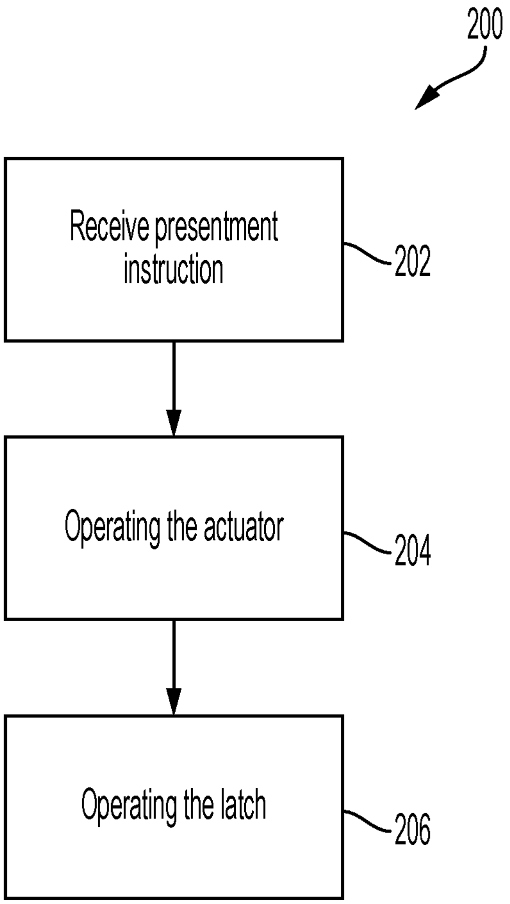
FIG. 14 is an exemplary flowchart illustrating an operation of the actuation system of FIGS. 9 and 11.

Referring to FIG. 14, shown is an actuation method 200 for operating a closure panel 12*a* of a vehicle 12, the method comprising the steps of: receiving 202 a presentment instruction for operating a handle portion 16 of a handle assembly 10 from a recessed position to a ready position, the handle assembly 10 having the handle portion 16 and a base portion 14, such that the handle portion 16 is operable between the recessed position and the ready position, the ready position having the handle portion 16 extending from the base portion 14; operating 204 an actuator 32 positioned on a body 11 of the vehicle 12 remote from the handle assembly 10 in order to manipulate a handle linkage 34 operatively coupling the actuator 32 to the handle portion 16 through a coupling mechanism 19 mounted on the base portion 14 of the handle assembly 10, in order to move the handle portion 16 from the recessed position to the ready position; and operating 206 a latch 30 of the closure panel 12*a* (e.g., via movement of the handle portion 16 further from the ready position), the latch 30 operatively coupled to the actuator 32 by an actuator linkage 33*a* separate from the handle linkage 34, the latch 30 for latching the closure panel 12*a* between a locked and an unlocked state. It is recognized that the operation 206 of the latch 30 can be performed before and/or after the presentment of the handle portion 16.

Figure 15:
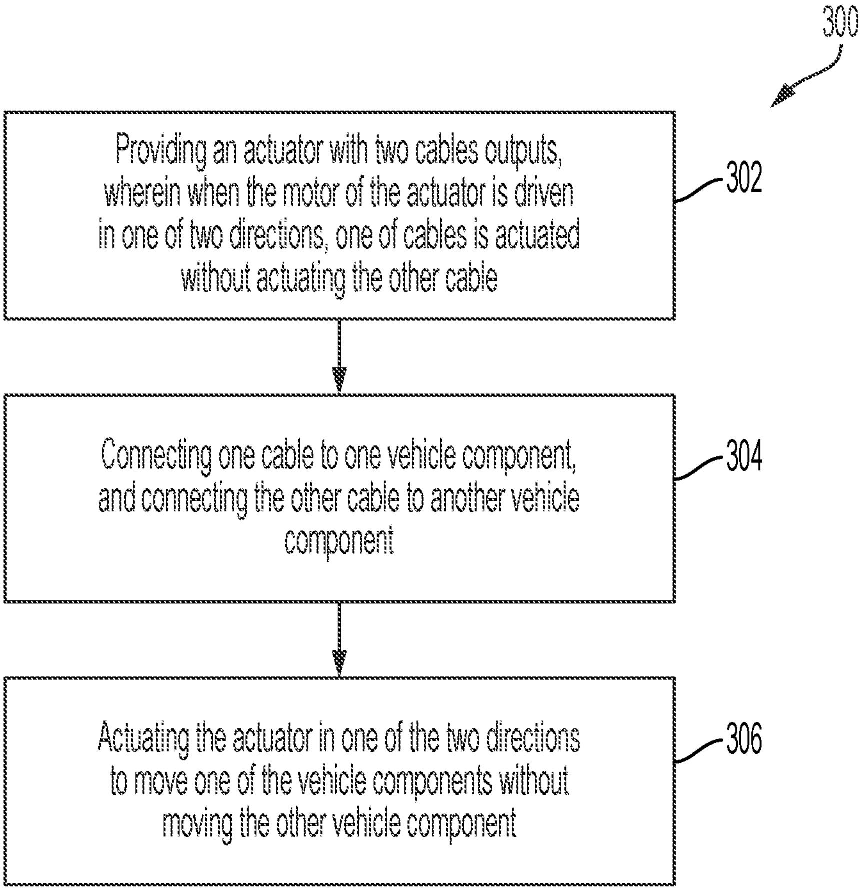
FIG. 15 is an exemplary flowchart illustrating an operation of the actuator of FIGS. 13*a*-13*c*.

Referring to FIG. 15, shown is an example operation of the actuator 32 embodiment of FIGS. 13*a*-13*c*. At step 302, the actuator 32 is provided with two cables 33*a*, 34 outputs, wherein when the motor of the actuator 32 is driven in one of two directions, one of the cables 33*a*, 34 is actuated without actuating the other of the cables 33*a*, 34. At step 304, one of the cables 33*a*, 34 is connected to one of the latch assembly 30 or the handle assembly 10 and the other of the cables 33*a*, 34 is connected to the other of the latch assembly 30 or the handle assembly 10. At step 306, the actuator 32 is actuated in one of the two directions to move one of the latch assembly 30 or the handle assembly 10 without moving the other of the latch assembly 30 or the handle assembly 10.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular door actuation system for a door of a vehicle, the vehicular door actuation system comprising:

a handle assembly including a handle portion and a base portion, the base portion disposed at the door of the vehicle and the handle portion movable between (i) a recessed position, where the handle portion nests at least partially in the base portion, and (ii) a ready position, where the handle portion extends from the base portion so as to be graspable by a user;

an actuator positioned at the door separate and remote from the handle assembly, wherein a handle linkage operatively couples operation of the actuator to the handle portion to move the handle portion from the recessed position to the ready position;

wherein the actuator, when operated to move the handle portion from the recessed position to the ready position, moves in a first direction to impart movement of the handle linkage to move the handle portion from the recessed position to the ready position;

a latch mechanism configured to latch the door in a closed state, and wherein the latch mechanism is configured to unlatch the door responsive to the user pulling the handle portion when the handle portion is in the ready position to allow the door to open;

wherein an actuator linkage operatively couples operation of the actuator to the latch mechanism, and wherein the actuator linkage is separate from the handle linkage;

wherein the actuator, responsive to the user pulling the handle portion when the handle portion is in the ready position, moves in a second direction to impart movement of the actuator linkage to operate the latch mechanism to unlatch the door to allow the door to open; and wherein the second direction is opposite the first direction.

2. The vehicular door actuation system of claim 1, wherein the actuator is located separate and remote from the latch mechanism.

3. The vehicular door actuation system of claim 1, wherein the handle linkage comprises a first cable.

4. The vehicular door actuation system of claim 3, wherein the actuator linkage comprises a second cable, and wherein the actuator (i) imparts movement of the first cable to move the handle portion from the recessed position to the ready position, and (ii) imparts movement of the second cable to operate the latch mechanism to unlatch the door.

5. The vehicular door actuation system of claim 1, wherein the actuator, responsive to the door being moved from an opened position to a partially closed position, operates the latch mechanism to further close the door from the partially closed position to a fully closed position.

6. The vehicular door actuation system of claim 5, wherein the handle linkage comprises a first cable and the actuator linkage comprises a second cable, and wherein the actuator (i) imparts movement of the first cable to move the handle portion from the recessed position to the ready position, and (ii) imparts movement of the second cable to control the latch mechanism to adjust the door from the partially closed position to the fully closed position.

7. The vehicular door actuation system of claim 6, wherein the actuator imparts movement of the first cable without imparting movement of the second cable and wherein the actuator imparts movement of the second cable without imparting movement of the first cable.

8. The vehicular door actuation system of claim 1, further comprising a cinch mechanism incorporated in the latch mechanism, the cinch mechanism being connected to the actuator by the actuator linkage.

9. The vehicular door actuation system of claim 1, further comprising a cinch mechanism incorporated in the latch mechanism, the cinch mechanism being connected to the actuator, wherein the actuator, responsive to the door being moved from an opened position to a partially closed position, operates the cinch mechanism to adjust the door from the partially closed position to a fully closed position.

10. The vehicular door actuation system of claim 1, wherein the actuator operates to move the handle portion from the recessed position to the ready position responsive to a wireless signal from one or more devices separate and remote from the vehicle.

11. The vehicular door actuation system of claim 10, wherein the one or more devices includes a key fob.

12. The vehicular door actuation system of claim 1, wherein the actuator is configured to operate independently of operation of the handle assembly and independently of operation of the latch mechanism.

13. The vehicular door actuation system of claim 1, wherein the first direction comprises a clockwise direction, and wherein the second direction comprises a counter-clockwise direction.

14. A method for operating a door of a vehicle, the method comprising:

providing a handle assembly at the door of the vehicle, the handle assembly having a handle portion and a base portion mounted at the door of the vehicle, the handle portion being movable between (i) a recessed position, where the handle portion nests at least partially in the base portion, and (ii) a ready position, where the handle portion extends from the base portion so as to be graspable by a user;

providing an actuator at the door of the vehicle, the actuator operatively connected to the handle assembly at the door, wherein the actuator is provided at a location that is separate and remote from the handle assembly;

receiving a presentment signal responsive at least in part to proximity to the vehicle of a remote device that is separate and remote from the vehicle;

responsive to receiving the presentment signal, operating the actuator to manipulate a handle linkage operatively coupling the actuator to the handle portion to move the handle portion from the recessed position to the ready position;

wherein the actuator, when operated to move the handle portion from the recessed position to the ready position, moves in a first direction to impart movement of the handle linkage to move the handle portion from the recessed position to the ready position;

responsive to the user pulling the handle portion from the ready position to open the door, operating the actuator to manipulate an actuator linkage operatively coupling the actuator to a latch mechanism of the door to unlatch the door to allow the door to open, wherein the actuator linkage is separate from the handle linkage;

wherein the actuator, when operated to unlatch the door to allow the door to open, moves in a second direction to impart movement of the actuator linkage to unlatch the door to allow the door to open; and wherein the second direction is opposite the first direction.

15. The method of claim 14, wherein operating the actuator includes performing a cinching operation of the latch mechanism to move the door from a partially closed position to a fully closed position.

16. The method of claim 14, wherein operating the actuator includes performing a cinching operation of the latch mechanism to fully close the door responsive at least in part to the door moved from an opened position to a partially closed position.

17. The method of claim 14, wherein the actuator is configured to operate independently of the handle assembly and the latch mechanism.

18. The method of claim 14, wherein the first direction comprises a clockwise direction, and wherein the second direction comprises a counter-clockwise direction.

19. A vehicular door actuation system for a door of a vehicle, the vehicular door actuation system comprising:

a handle assembly including a handle portion and a base portion, the base portion disposed at the door of the vehicle and the handle portion movable between (i) a recessed position, where the handle portion nests at least partially in the base portion, and (ii) a ready position, where the handle portion extends from the base portion so as to be graspable by a user;

a latch mechanism configured to latch the door in a closed state, and wherein the latch mechanism is configured to unlatch the door responsive to the user pulling the handle portion when the handle portion is in the ready position to allow the door to open;

an actuator positioned at the door separate and remote from the handle assembly and separate and remote from the latch mechanism;

wherein a handle linkage operatively couples operation of the actuator to the handle portion to move the handle portion from the recessed position to the ready position;

wherein the actuator, when operated to move the handle portion from the recessed position to the ready position, moves in a first direction to impart movement of the handle linkage to move the handle portion from the recessed position to the ready position;

wherein a latch linkage operatively couples operation of the actuator to the latch mechanism, and wherein the latch linkage is separate from the handle linkage;

wherein the actuator, responsive to the user pulling the handle portion when the handle portion is in the ready position, moves in a second direction to impart movement of the latch linkage to operate the latch mechanism to unlatch the door to allow the door to open;

wherein the second direction is opposite the first direction; and wherein the actuator (i) imparts movement of the handle linkage to move the handle portion from the recessed position to the ready position, and (ii) imparts movement of the latch linkage to operate the latch mechanism to unlatch the door.

20. The vehicular door actuation system of claim 19, wherein the handle linkage comprises a first cable and wherein the latch linkage comprises a second cable.

21. The vehicular door actuation system of claim 19, wherein the actuator, with the door in a partially closed position, imparts movement of the latch linkage to operate the latch mechanism to further close the door from the partially closed position to a fully closed position.

22. The vehicular door actuation system of claim 19, wherein the actuator imparts movement of the handle linkage without imparting movement of the latch linkage and wherein the actuator imparts movement of the latch linkage without imparting movement of the handle linkage.

23. The vehicular door actuation system of claim 19, wherein the first direction comprises a clockwise direction, and wherein the second direction comprises a counterclockwise direction.

* * * * *